United States Patent [19]

Bernhardt

[11] Patent Number: 4,990,083
[45] Date of Patent: Feb. 5, 1991

[54] NOZZLE FOR INJECTION MOLDING MACHINES

[75] Inventor: Achim Bernhardt, Heinburg, Fed. Rep. of Germany

[73] Assignee: Knökner Ferromatik Desma GmbH, Malterdingen, Fed. Rep. of Germany

[21] Appl. No.: 421,116

[22] Filed: Oct. 13, 1989

[30] Foreign Application Priority Data

Oct. 13, 1988 [DE] Fed. Rep. of Germany ....... 3834917

[51] Int. Cl.[5] ............................................. B29C 45/22
[52] U.S. Cl. .................................. 425/547; 264/328.8; 264/328.9; 264/328.16; 264/572; 425/562; 425/564; 425/566; 425/577
[58] Field of Search ............... 425/130, 533, 536, 562, 425/563, 564, 566, 568, 571, 577, 522, 523, 524, 526, 529, 535, 547; 264/572, 328.8, 328.9, 328.13, 328.15, 328.16

[56] References Cited

U.S. PATENT DOCUMENTS

| 4,101,161 | 7/1978 | Friedrich | 425/533 |
| 4,740,150 | 4/1988 | Sayer | 425/562 |
| 4,917,594 | 4/1990 | Gellert | 425/564 |

FOREIGN PATENT DOCUMENTS

| 2106546 | 8/1972 | Fed. Rep. of Germany . |
| 2800482 | 6/1978 | Fed. Rep. of Germany . |
| 2122130 | 1/1984 | United Kingdom . |
| 2139548 | 11/1984 | United Kingdom . |
| 2202181 | 9/1988 | United Kingdom . |

*Primary Examiner*—Timothy Heitbrink
*Attorney, Agent, or Firm*—Watson, Cole, Crindle & Watson

[57] ABSTRACT

A nozzle located in an injection mold for injecting a first medium into a mold cavity containing a second medium. The injection molding has a first bore connected to a first mold surface via a second bore. An outer blowing needle having a first terminal end is located within the first and second bores. An inner blowing needle having a second terminal end is located within the outer blowing needle and has at least one opening near the second terminal end which communicates with the second bore. The inner blowing needle is axially displaced relative to the outer blowing needle and the first and second bores of the injection mold via a stop-spring arrangement such that the second terminal end of the inner blowing needle moves from a first position even with the first terminal end of the outer blowing needle to a second position located between the opposed first and second mold surfaces and back to the first position, to allow the first medium to be injected into the second medium when the second terminal end is in the second position. The inner and outer blowing needles are axially displaced relative to the first and second bores when the second terminal end is moved back to the first position via a stop spring arrangement such that the second terminal end of the inner blowing needle and the terminal end of the outer blowing needle are moved to a third position even with the first mold surface to ensure a smooth and seamless mold cavity.

12 Claims, 2 Drawing Sheets

NOZZLE FOR INJECTION MOLDING MACHINES

BACKGROUND OF THE INVENTION

1. Technical Field of the Invention

This invention relates generally to injection molding and more particularly to a nozzle for injection molding machines 2. Discussion of the Related Art A nozzle for an injection molding machine is described in West German Patent DE-OS 21 06 546. However, this nozzle has as an output channel and only one blowing needle which is Permanently connected to the nozzle and has a constant length. Accordingly, when the mold is closed, this nozzle always extends to the fluid center of the plastic previously injected by means of another nozzle and thus leaves an opening or at least—if the second medium is another plastic component—a distinct disturbance of the surface in the extruded plastic article which is apparent when the mold is opened after the first injected plastic has set. This problem is also present in the identical embodiments of the injection molding machine described in FIGS. 1 and 2 of GB-PS 2 139 548.

Such openings or disturbances of the surface are undesirable in many injection molded plastic articles. To correct the imperfections, the articles must be subjected to another after-treatment. Moreover, this problem is also present in injection molded plastic articles which are produced with a generic nozzle according to the British patent application GB 2 202 181. This generic nozzle has a single axially movable blowing needle wherein the interior of the blowing needle forms the supply line which is provided with a non-return valve and supplies a second medium to the mold cavity. The outside of the blowing needle and the inside of the cavity of the nozzle body in the withdrawn state form an annular gap in the region of the nozzle orifice which—when the second medium is a compressed gas or a liquid under pressure—serves solely to relieve the pressure of the second medium after the first injected plastic has set.

The problem of the residual opening or at least distinct disturbance of the surface is also not eliminated by the use of two component nozzles that are no longer generic as disclosed in US-PS 4 101 617, DE-PS 28 00 482 or the embodiment of FIG. 5 in the GB-PS 2 139 548. During the injection process, either an axially movable or permanent blowing needle is used whereby a cylindrical central strand comprising the second medium is for a time at least enclosed by a hollow cylindrical strand comprising the polymer melt forming the outer skin of a plastic article. In the case where the pressure of the second medium is maintained by the nozzle in the mold and runner until the outer polymer melt has cured, an opening or a distinct disturbance of the surface of the plastic article remains in the runner itself after the removal of the runner (cf. for example FIGS. 1-3, 1-4, and 2-1 to 2-3 in the DE-PS 28 00 482 and the embodiment in FIG. 5 of the GB-PS 2 139 548). In the case where after the construction of the plastic article interior which is filled with the second medium and a stopper of the outer polymer melt is pushed into the mold cavity (cf. FIG. 3 of the US-PS 4 101 617) and the second medium is a compressed gas or a liquid under pressure, another opening must be punched or drilled into the plastic article from the outside before or even after opening the mold for safety reasons (cf. also FIGS. 2 and 3 of US-PS 4 101 617). In addition to these problems, two component nozzles have a significantly more complicated design than nozzles for a single component of an injection molding unit which processes several components simultaneously. Accordingly, in many cases it is more cost-effective and requires less maintenance to equip an injection molding unit for the simultaneous processing of several components with several nozzles for each component to be injected than with a single multi-component nozzle.

Therefore, it is an object of the present invention to Provide a nozzle for injection molding machines which introduces a second medium into the interior of a first polymer melt that is already partially or completely injected into an injection mold, wherein with minimum design this nozzle permits the seamless closing of the lead-in opening for the second medium through the first polymer melt.

It is a further object of the present invention to accomplish the foregoing object while permitting the relief of Pressure in the interior of the plastic article within the closed mold without an external opening of the plastic article when the second medium is a compressed gas or liquid under pressure.

Other objects and advantages will become apparent from the specification and drawings which follow.

SUMMARY OF THE INVENTION

The foregoing and additional objects are obtained by a nozzle according to the present invention for injecting a medium into a mold cavity of an injection molding machine defined by a pair of opposing mold surfaces and having another medium present therein. This nozzle includes an output channel aligned with a bore in the machine located outside one of the mold surfaces and in communication therewith. An outer blowing needle is located within the output channel and has a terminal end. An inner blowing needle is located within the outer blowing needle and has a central bore with a closed terminal end as well as at least one opening communicating with the central bore located near its closed terminal end. A first means is provided for displacing the inner blowing needle axially relative to the outer blowing needle, the output channel, and the bore such that the closed terminal end of the inner needle is located half the distance between the pair of opposing mold surfaces. A second means is provided for displacing the inner and outer blowing needles axially relative to the output channel, and the bore such that the closed end of the inner needle and terminal end of the outer needle are level with one of the mold surfaces. Accordingly, the terminal ends of the inner and outer blowing needles supplement one of the mold surfaces to ensure a smooth and seamless mold.

DETAILED DESCRIPTION OF THE PREFERRED EMBODIMENTS

Figure 1:
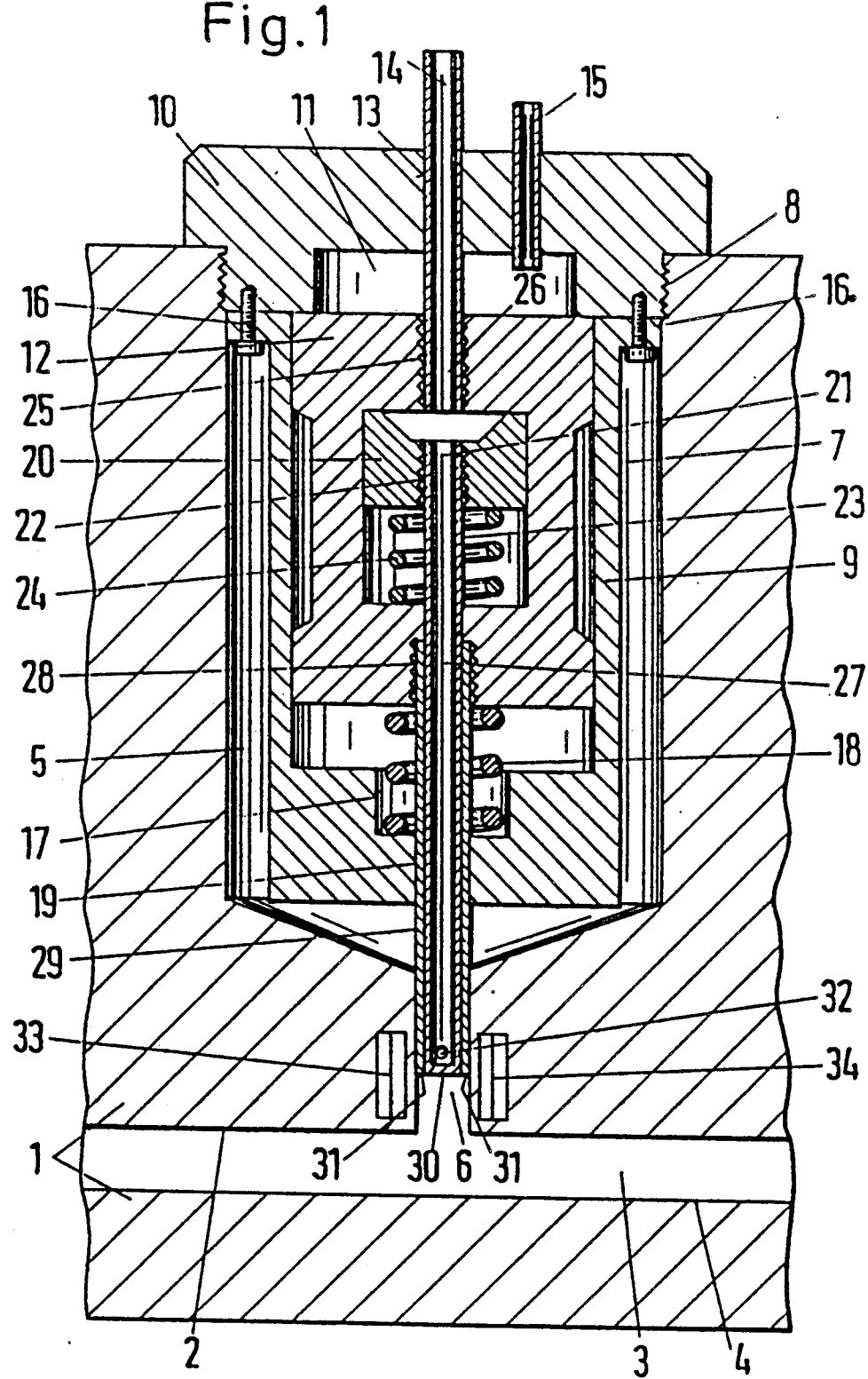
FIG. 1 is a side sectional view of a nozzle of the invention.

FIG. 1 shows a cutaway portion of a mold 1 of an injection molding machine having a mold cavity 3 enclosed between a pair of opposing upper and lower mold surfaces 2 and 4 and which can be partially or completely filled in the conventional manner with a plasticized polymer melt by means of a supply nozzle (not illustrated). The terms "upper" and "lower" are used to define the relative positions of the mold surfaces. As such, they are not intended to limit the invention since the nozzle can enter from the lower surface or either of the opposing right or left surfaces.

A bore 5, which tapers off at its mold-sided end and then passes over into another bore 6 having a smaller diameter, is admitted into a part of the mold 1. A nozzle 7 is inserted into the bore and is positioned via a force locking connection 8, e.g., a screw thread in bore 5. Nozzle 7 introduces a second medium, e.g., a gas, liquid, or another foamable or non-foamable polymer melt, into the cavity 3.

The nozzle 7 consists of a two-part nozzle housing which comprises a nozzle body 9 and a nozzle chamber shutoff 10. As illustrated, the nozzle chamber shutoff 10 is designed as a screw which engages the thread of bore 5 having a hexagonal screw head with a centered recess 11. The inner diameter of this centered recess 11 is smaller than that of a piston 12 movable in the axial direction in the nozzle body 9 so that a part of the end face of the screw 10 opposite the head serves as the stop for the piston 12. As illustrated, the nozzle chamber shutoff 10 has a central bore 13 which serves as the sliding packing for an axially movable supply line 14 supplying the nozzle 7 with the second medium to be injected into the mold cavity 3. Shutoff 10 also has a line 15 connected frictionally to it for a pneumatically or hydraulically compressed medium to be guided into the central recess 11 or out of it. The nozzle chamber shutoff 10 is arrested in the bore 5 by means of the force-locking connection 8 as discussed above and also bears the nozzle body 9 by means of another force-locking connection 16 such as screws.

The nozzle body 9 is substantially a hollow cylinder in which a piston 12 can be moved axially. At the mold-sided end the nozzle body 9 has a constriction 17 of its inner diameter which forms the other stop for the piston 12 as well as a seat for a spring 18. Another constriction of the inner diameter of the nozzle body represents the mold-sided output channel 19 of the nozzle 7.

This piston 12 is also a hollow cylinder that is to be opened mechanically and closed frictionally and whose separating joint and force-locking connection are not explicitly shown in the present drawing for the sake of simplicity. In the inner cavity of the piston 12 there is another axially movable piston 20 with a central bore 21, in which an inner blowing needle 23 that is to be guided out of the piston 20 in the direction of the mold cavity 3 is arrested by means of a force-locking connection 22. A spring 24 retains the piston 20 in a state of rest against the inner surface of the upper end of piston 12 that is turned away from the mold 3. As illustrated, the inner cavity of the piston 12 is connected at its upper end to the line 14 communicating with the second medium and is anchored by means of a force-locking connection 25 in a central bore 26 in piston 12. In addition, the piston 12 has at its mold-sided lower end another central bore 27 in which is arrested an outer blowing needle 29 that is to be guided out of the piston 12 in the direction of the mold cavity 3 by means of another force-locking connection 28.

Bore 27 and outer blowing needle 29 are dimensioned in such a manner that the inner blowing needle 23 can be moved from the point of view of fitting at least in the outer blowing needle 29 without impeding the movement of the inner blowing needle 23. On the other hand, the output channel 19 of the nozzle 7 and the bore 6 are designed in such a manner that the outer blowing needle 29 can slide so as to fit in both bores. Thus, outer blowing needle 29 and inner blowing needle 23 may be displaced axially relative to each other and the output channel 19 and bore 6.

Figure 2:
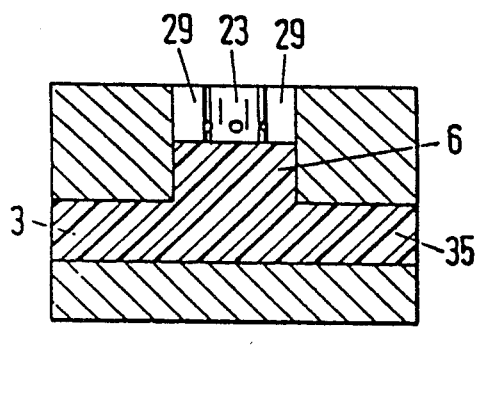
FIGS. 2a-2d show side sectional views of the ends of the nozzle needles in various stages of an injection molding process with a second medium.
Figure 2:
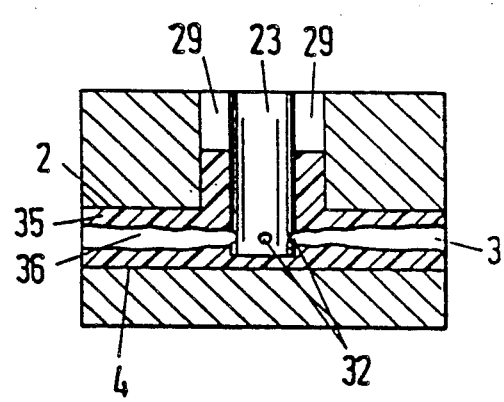
Figure 2:
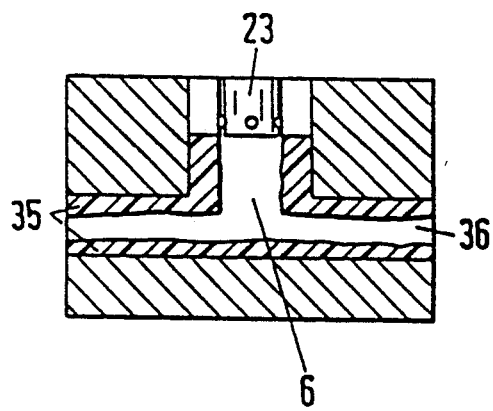
Figure 2:
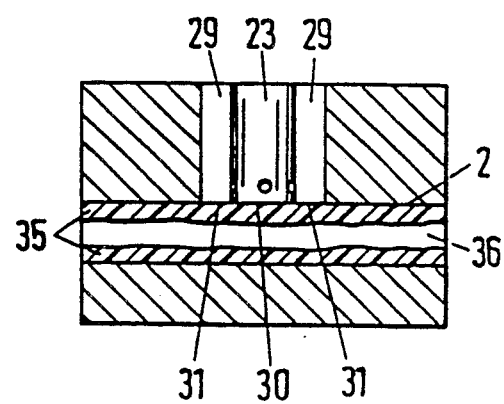

The lengths of the coaxial blowing needles 23 and 29 are compatible to such an extent that in a state of rest they terminate on the same level on the side of the mold, in the case shown within the bore, or also within the output channel 19. In any event, the blowing needles should be designed such that a portion of the first injected polymer melt can be stored before the respective lower terminal end faces 30 and 31 of blowing needles 23 and 29 and outside the actual mold cavity 3 as shown in FIG. 2A. The lower terminal end faces 30 and 31 are designed in such a manner that when moved simultaneously to the level of the nearest mold surface 2, they supplement the mold without any disturbances. To accomplish this goal, the end face 30 of the inner blowing needle 23 is closed. To permit the second medium to escape from the inner blowing needle 23 into the mold cavity 3 or to relieve the pressure of a gas or liquid filling of the injection molded plastic article, the inner blowing needle 23 has one or more output openings 32 directly behind its end face 30. These openings 32 permit the second medium to enter into a first injected polymer melt largely parallel to the mold surfaces 2 and 4.

The mouth region of the bore 6 is provided with a heater 33 and/or a special thermal insulation 34 so that the portion of the first injected polymer melt stored in the mouth region is held at a lower viscosity than the rest of the first injected polymer melt until a shutoff plug is formed. Corresponding devices can also be installed, if desired, in the mouth region of the output channel 19 of the nozzle 7.

FIGS. 2a–2d show the position of the mold-sided ends of the blowing needles 23 and 29 in various stages of an injection molding process. The starting position of the process is shown in FIG. 1. From this starting position, a first polymer melt 35 is injected into the mold cavity 3 by a nozzle (not illustrated) of the well-known type. As shown in FIG. 2a, when the position of the ends of the blowing needles 23 and 29 are unchanged from the starting position, a portion of the first polymer melt is stored in the mouth region of the bore 6 outside the actual mold cavity 3.

Then the supply line 14 in FIG. 1 is loaded with pressure by means of a known control whereby the piston 20 is moved to such an extent in the direction of the mold cavity 3 against the force of the spring 24 that the output opening 32 of the inner blowing needle 23 stops approximately midway between the two mold surfaces 2 and 4. Next, the second medium 36 is conveyed to this point via the supply line 14 and the blowing needle 23 is forced into the first injected polymer melt 35 essentially parallel to the mold surfaces 2 and 4 as shown in FIG. 2b.

After the first injected polymer melt 35 begins to cure, the supply line 14 is connected to the atmosphere or to a supply vessel under atmospheric pressure by means of a known control (not illustrated), whereby the second medium 36 in the injection molded article experiences a relief in pressure and at the same time the piston 20 and the inner blowing needle 23 return to their starting position as shown in FIG. 2c. The first injected polymer melt now forms a cavity filled with the second medium 36 under atmospheric pressure and a portion of the polymer melt 35 is still stored in the mouth region of the bore 6.

According to FIG. 2d, this stored portion of the polymer melt 35 is pushed down to the level of the upper mold surface 2 when the central recess 11 in the nozzle chamber shutoff 10 is loaded with a pneumatic or hydraulic pressure medium over the supply line 15 by a known control (not illustrated). This loading causes the piston 12 as well as the piston 20 and the blowing needles 23 and 29 to be moved to such an extent in the direction of the nearest upper mold surface 2 against the force of the springs 18 and 24 so that the lower terminal end faces 30 and 31 of the blowing needles 23 and 29 supplement the upper mold surface 2 essentially trouble free.

The resulting seamless plug thus obtained comprising the material of the first injected polymer melt is then cured. Next, the supply line 15 is relieved of the pressure load by the known control (not illustrated) so that the piston 12 and the piston 20 return to their starting position along with blowing needles 23 and 29, as shown in FIG. 1.

The injection molding process ends with the mold being subsequently opened and the injection molded plastic article being ejected and can be repeated after the mold has been re-closed. With this design, the inner blowing needle can be used as the supply line for the second medium and can be driven adequately deeply into a first polymer melt that is already located in the mold cavity in order to then inject the second medium into the first polymer melt essentially parallel and symmetrically to the mold surfaces. The outer blowing needle remains pulled back to such an extent that a quantity of material of the first polymer melt that is adequate to later design a locking plug can be stored between the inner blowing needle and the wall of the output channel of the nozzle or of a bore in the mold that continues to be in alignment with the nozzle up to the upper mold surface. Especially when the second medium is a compressed gas or a liquid under pressure, the inner blowing needle that is moved out can also be used in addition to this locking plug to equalize the pressure between the interior of the plastic body and the atmosphere after the formation of an inner bubble of the second medium in the first polymer melt and after the outer layer comprising the first polymer melt begins to harden.

After the pressure between the interior of the plastic body and the atmosphere has been equalized, the inner blowing needle can be moved back to such an extent that the end faces of both blowing needles are on the same level in order then to move out both blowing needles together up to the nearest mold surface. Accordingly, the supply of material of the first polymer melt stored previously between the inner blowing needle and the wall of the output channel of the nozzle or of the bore that is recessed in the mold continues to be in alignment with the nozzle is forced into the outer wall of the plastic body as a seamless plug. This is especially true when in another advantageous embodiment of the nozzle of the invention the wall of its output channel or of a bore that is recessed in the mold and continues to be in alignment with it up to the mold surface is provided with a special thermal insulation and/or a heater.

Although the present invention has been described with reference to preferred embodiments, many modifications and improvements will become apparent to one skilled in the art without departing from the spirit and scope of the invention as defined by the following claims.

I claim:

1. A nozzle for injecting a first medium into a mold cavity of an injection mold, the mold cavity defined by a pair of opposed first and second mold surfaces of said injection mold, said mold cavity having a second medium present therein, the injection mold having a first bore located outside the first mold surface wherein the first mold surface is connected to the first bore via a second bore, said first bore being larger in diameter than said second bore, the nozzle comprising:
   an outer blowing needle located within the first bore and the second bore, said outer blowing needle having a first terminal end;
   an inner blowing needle located within said outer blowing needle, said inner blowing needle having a second terminal end and a central bore closed at said second terminal end, said inner blowing needle having near said second terminal end at least one opening communicating with the central bore;
   first displacing means for displacing said inner blowing needle axially relative to said outer blowing needle and axially relative to the first and second bores of the injection mold such the second terminal end of said inner blowing needle moves from a first position even with the first terminal end of the outer blowing needle to a second position located between said opposed first and second mold surfaces and back to said first position, whereby said first medium passes through said central bore, out of said at least one opening and into said second medium when said second terminal end is in the second position; and
   second displacing means for displacing said outer and said inner blowing needles axially relative to the first and second bores of the injection mold when said second terminal end of said inner blowing needle is moved back to said first position such that said second terminal end of the inner blowing needle and the first terminal end of said outer blowing needle are moved to third position even with the first mold surface,
   whereby the first and second terminal ends of said inner and outer blowing needles supplement the first mold surface to ensure that said mold cavity is smooth and seamless.

2. The nozzle according to claim 1, wherein said first displacing means displaces said inner blowing needle such that said at least one opening is located midway between the opposed first and second mold surfaces of the cavity.

3. The nozzle according to claim 1, wherein said second displacing means is hydraulically driven.

4. The nozzle according to claim 1, wherein said second displacing means is pneumatically driven.

5. The nozzle according to claim 1, wherein said first displacing means comprises a first stop connected to said inner blowing needle, first driving means for driving said stop, and a first spring opposing axial displacement of said first stop toward the mold cavity.

6. The nozzle according to claim 1, wherein said second displacing means comprises a stop connected to said outer blowing needle, means for driving said stop, and a spring opposing axial displacement of said stop toward the mold cavity.

7. The nozzle according to claim 1, wherein a wall of said second bore is provided with a heater.

8. The nozzle according to claim 1, wherein a wall of said second bore is provided with thermal insulation.

9. The nozzle according to claim 1, further comprising attaching means for attaching the nozzle to the injection mold.

10. The nozzle according to claim 1, further comprising attaching means for attaching the nozzle to the first bore located within the injection mold.

11. The nozzle according to claim 9, wherein said attaching means comprises a threaded surface on the nozzle which engages a threaded surface on the first bore.

12. The nozzle according to claim 1, wherein the first bore of the injection mold tapers toward the second bore and the mold cavity to a diameter which is slightly larger than an outer diameter of said outer blowing needle.

* * * * *

UNITED STATES PATENT AND TRADEMARK OFFICE
CERTIFICATE OF CORRECTION

PATENT NO. : 4,990,083
DATED : February 5, 1991
INVENTOR(S) : Achim BERNHARDT

It is certified that error appears in the above-identified patent and that said Letters Patent is hereby corrected as shown below:

On the title page:

In Item [73], please change the name of the assignee from "Knöckner Ferromatik Desma GmbH" to --Klöckner Ferromatik Desma GmbH--.

Signed and Sealed this

Twenty-second Day of September, 1992

Attest:

DOUGLAS B. COMER

*Attesting Officer*   *Acting Commissioner of Patents and Trademarks*